(12) United States Patent
Gu et al.

(10) Patent No.: US 7,286,288 B2
(45) Date of Patent: Oct. 23, 2007

(54) METHOD AND SYSTEM FOR FLEXIBLE AND COST EFFECTIVE DYNAMIC TILT GAIN EQUALIZER

(76) Inventors: Shijie Gu, 1111 N. Morse Ave. Spc 125, Sunnyvale, CA (US) 94089; Zhanxiang Zhang, 10446 San Fernando Ave., Cupertino, CA (US) 95014

( * ) Notice: Subject to any disclaimer, the term of this patent is extended or adjusted under 35 U.S.C. 154(b) by 0 days.

(21) Appl. No.: 11/399,978

(22) Filed: Apr. 7, 2006

(65) Prior Publication Data
US 2006/0238869 A1 Oct. 26, 2006

Related U.S. Application Data

(62) Division of application No. 10/818,255, filed on Apr. 5, 2004, now Pat. No. 7,133,202.

(51) Int. Cl.
*G02B 5/30* (2006.01)

(52) U.S. Cl. .................. 359/499; 359/495; 359/337.1; 385/11; 398/65

(58) Field of Classification Search .............. 359/337.1
See application file for complete search history.

(56) References Cited

U.S. PATENT DOCUMENTS

| 6,829,396 B2* | 12/2004 | Naganuma .................... 385/11 |
| 7,050,232 B2* | 5/2006 | Wada et al. ................ 359/494 |
| 2002/0191274 A1* | 12/2002 | Abe et al. ................ 359/337.1 |

* cited by examiner

*Primary Examiner*—Arnel C. Lavarias
*Assistant Examiner*—Derek S. Chapel (57) ABSTRACT

Method and system for flattening tilt gain with a digital title gain equalizer ("DTGE") constructed with a linear tilt optical filter ("LTOF"). In a first embodiment, a DTGE flattens tilt gain with a combination of LTOF and a rotative half-wave plate. In a second embodiment, a DTGE flattens tilt gain with a combination of LTOF and variable Faraday rotators.

7 Claims, 12 Drawing Sheets

METHOD AND SYSTEM FOR FLEXIBLE AND COST EFFECTIVE DYNAMIC TILT GAIN EQUALIZER

CROSS REFERENCE TO RELATED APPLICATIONS

This application is a divisional of and claims the benefit of application Ser. No. 10/818,255, filed Apr. 5, 2004 now U.S. Pat. No. 7,133,202 entitled "Method and System for Flexible and Cost Effective Dynamic Tilt Gain Equalizer," naming Shijie Gu and Zhanxiang Zhang as inventors.

BACKGROUND INFORMATION

1. Field of Invention

The present invention relates to fiber optics technology, and more particularly, to dynamic tilt gain equalizers.

2. Description of Related Art

In recent years, fiber optic communication systems have become increasingly popular for data transmission due to their high speed and high data capacity capabilities. Multiplexing the data transmitted via a fiber maximizes the transmittable data volume. Particularly, Wavelength Division Multiplexing ("WDM") systems increase the transmission data rate through single-mode optical fiber by simultaneously propagating light from spectrally different but equally powered laser sources through the fiber.

Moreover, in WDM optical links, it is important to keep the signals of all the channels in a fiber at the same power level in order to avoid signal-to-noise ratio degradation due to the gain characteristics in optical amplifiers. This is difficult to accomplish because the non-flat gain profiles over the desired spectral ranges in optical amplifiers cause variations in power levels for different channels.

In a configuration of cascaded optical amplifiers in a WDM link, lower accumulated gain in certain wavelengths reduces signal-to-noise ratio, and this ratio limits the transmission distance. This problem may be resolved by installing fixed-gain filters in each amplifier to achieve a flattened gain. However, the gain profiles in the amplifiers vary in accordance to the number and power levels of the channels; and in a dynamically reconfigurable WDM network, the gain profiles of optical amplifiers will vary with network reconfiguration. Furthermore, even for simple point-to-point fixed add/drop WDM systems, there are design considerations relating to future addition of channels or reduction of WDM wavelength spacing. Thus, the gain profiles will vary as the number of channels varies.

If the gain of an optical amplifier is linearly dependent on the wavelength of the amplified signal, this dependence is known as the "gain tilt" of the amplifier. Therefore, when a WDM signal light is amplified by an optical amplifier (e.g. erbium-doped fiber amplifier, etc.), each of the signals of the individual channel may be amplified with a different gain.

Figure 1:
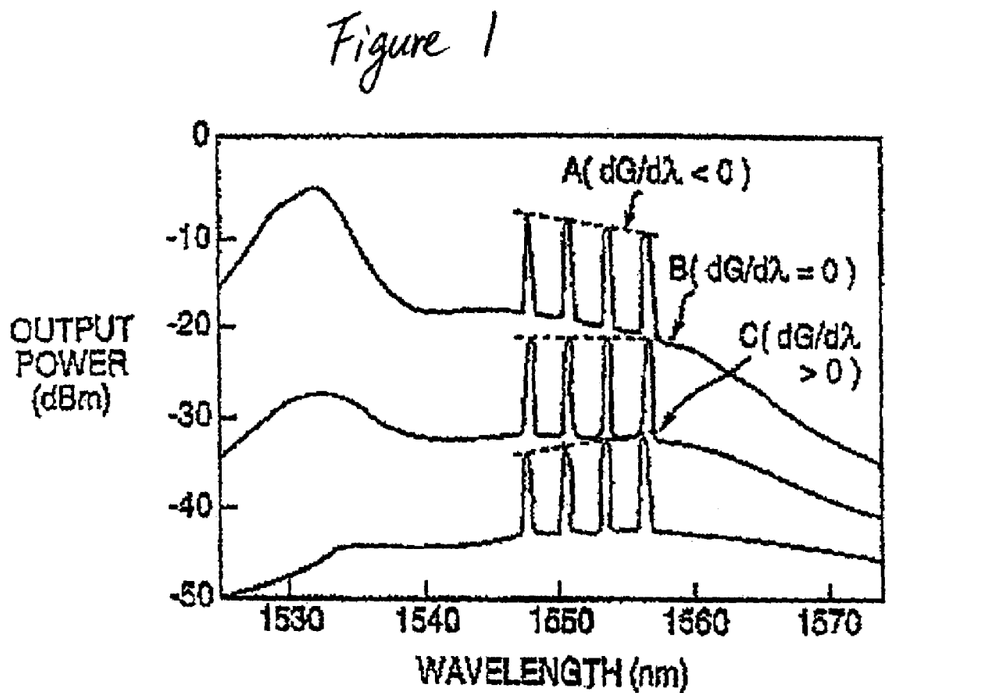
FIG. 1 is a graph illustrating three gain tilt effects having a positive, a flat, and a negative slope respectively.

The gain tilt effect occurs when the input power or channel numbers changes. FIG. 1 illustrated a positively sloped gain tilt denoted S1, a flat gain tilt denoted S3, and a negatively sloped gain tilt denoted S5. Typically, positive sloped gain tilt S1 occurs the most frequently, and for a WDM system, this gain tilt must be flattened. Therefore, with the fast-growing interest in dynamic reconfigurable WDM networks and scalability considerations, dynamically controlled optical gain equalizers become essential elements for the next generation optical networks.

Figure 2:
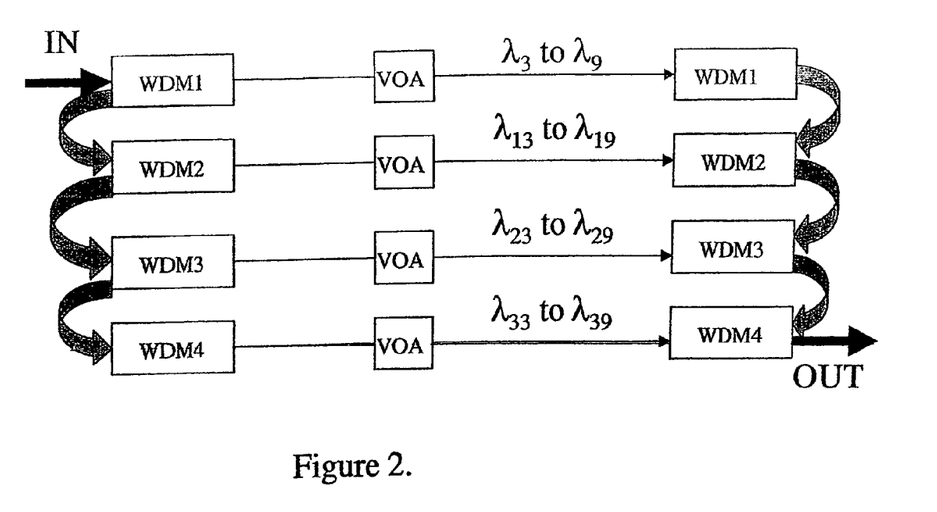
FIG. 2 is a block diagram illustrating the use of a prior art DTGE in the process of flattening gain tilt by separating the c-band into multiple windows.

In an effort to equalize the gain tilt, several methods have been developed for optical power equalizers. Some approaches separate the WDM channels and adjust each individually. This can be done in a first method by using a multiplexer/demultiplexer pair such as a phased array grating with an array of liquid crystal variable optic attenuators ("VOA"). The use of such a dynamic gain tilt equalizer ("DTGE") can flatten the gain tilt, but such equalizers are complex and costly. FIG. 2 illustrates one method of flattening gain tilt by using this type of DTGE whereby the c-band is separated into four different windows. Subsequently, each window of channels goes through a corresponding WDM such that channels ("$\lambda$") 3 to 9 go through WDM1, $\lambda_{13}$ to $\lambda_{19}$ go through WDM2, $\lambda_{23}$ to $\lambda_{29}$ go through WDM3, and $\lambda_{33}$ to $\lambda_{39}$ go through WDM4. After passing through its corresponding WDM, each window also goes through a corresponding VOA to adjust optical loss as shown in FIG. 2. Although the method shown in FIG. 2 roughly flattens a gain tilt, it has many disadvantages: 1) it incorporates too many components such as the WDM's and VOA's shown in FIG. 2; 2) the gaps between WDM's miss some of the channels; and 3) the gain tilt for channels in the same window is not eliminated.

An alternative method for dynamic tilt gain equalizer uses all-fiber, acousto-optic tunable filter ("AOTF") technology. An all-fiber AOTF system works by creating wavelength selective losses as signals travel through an optical fiber. The wavelength selective losses are induced by imposing a tunable small-amplitude acoustic wave on a short length of optic fiber. Each AOTF creates a "notch" or rejection band in the optical spectrum, whereby the notch position and depth is independently adjustable with software. Each tilt gain equalizer contains eight AOTF's in series to produce the desired attenuation profile over the c- or l-band. However, this method is also complex and costly due to the use of many super-sound generators.

SUMMARY OF THE INVENTION

The present invention provides a method and system for flattening gain tilt with a DTGE constructed with a linear tilt optical filter ("LTOF"). In order to equalize the gain tilt, an input light beam is divided into two beams, one of which passes through the LTOF in the DTGE, and the two beams are subsequently combined into a single output beam. The DTGE flattens the tilt gain by controlling the dividing ratio between the two divided light beams.

The present invention describes two embodiments for flattening gain tilt with a DTGE constructed with a LTOF. In a first embodiment, the DTGE flattens the tilt gain by using a LTOF in conjunction with a rotative half-wave plate. In a second embodiment, the DTGE flattens the tilt gain by using a LTOF in conjunction with variable Faraday rotators.

BRIEF DESCRIPTION OF THE DRAWINGS

The accompanying drawings that are incorporated in and form a part of this specification illustrate embodiments of the invention and together with the description, serve to explain the principles of the invention.

DETAILED DESCRIPTION

The following description is presented to enable one of ordinary skill in the art to make and use the invention and is provided in the context of a patent application and its requirements. In the following description, specific nomenclature is set forth to provide a thorough understanding of the present invention. It will be apparent to one skilled in the art that the specific details may not be necessary to practice the present invention. Furthermore, various modifications to the embodiments will be readily apparent to those skilled in the art and the generic principles herein may be applied to other embodiments. Thus, the present invention is not intended to be limited to the embodiments shown but is to be accorded the widest scope consistent with the principles and features described herein.

Figure 3:
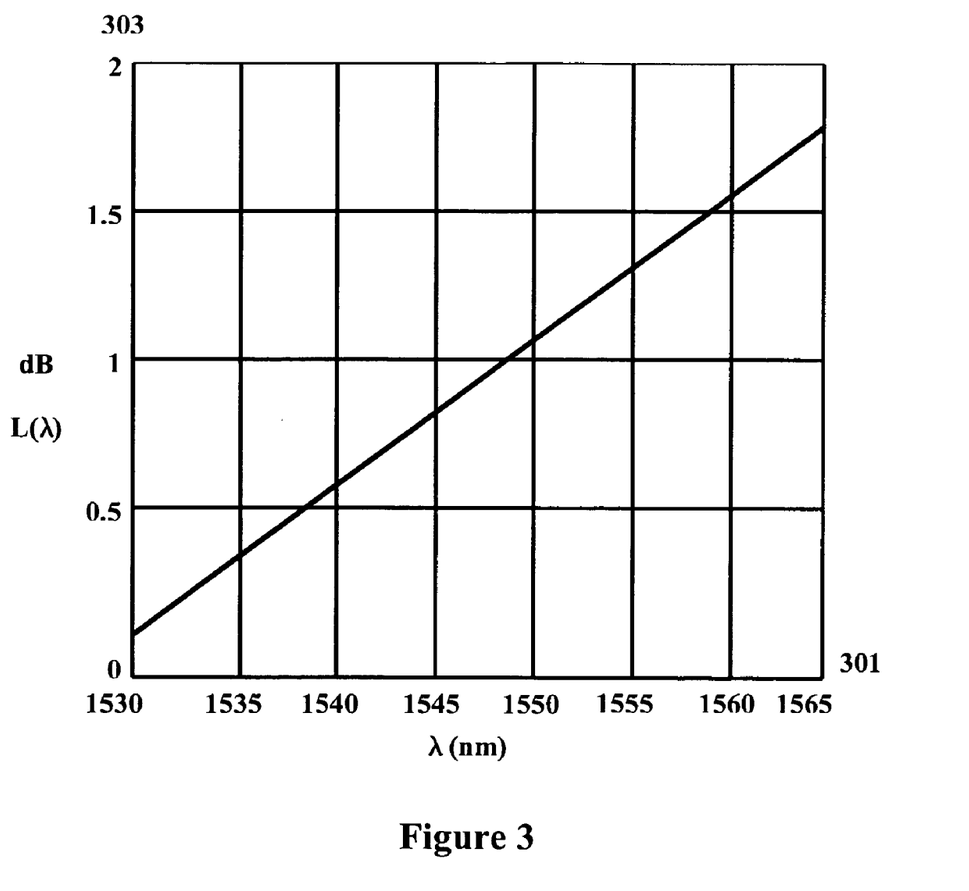
FIG. 3 is an attenuation profile of a linear tilt optical filter ("LTOF").

The DTGE in accordance with the methods of the present invention are constructed with LTOF. The loss of light through a LTOF depends linearly on the wavelength of the light as illustrated by the attenuation profile in FIG. 3, wherein the horizontal axis 301 represents wavelength $\lambda$ and the vertical axis 303 represents loss of light L($\lambda$). Moreover, the loss of light may be calculated with the formula:

$$L(\lambda)=a(\lambda-\lambda_{min})+b(dB) \quad \text{(Equation 1)}$$

where $\lambda$ is the wavelength of the light; $\lambda_{min}$ is the shortest wavelength in the wavelength range of the LTOF; "a" (dB/nm) is the slope of the LTOF and "b" is the insertion loss. There are currently several manufacturers who can supply very cost effective LTOF's that have excellent performance specifications. For example, one such LTOF may have an "a" from −0.5 to 0.5 dB/nm; an insertion loss "b" less than 0.3 dB; a very low chromatic dispersion (<0.2 ps/nm); and a polarization dependent loss less than 0.05 dB.

Figure 4:
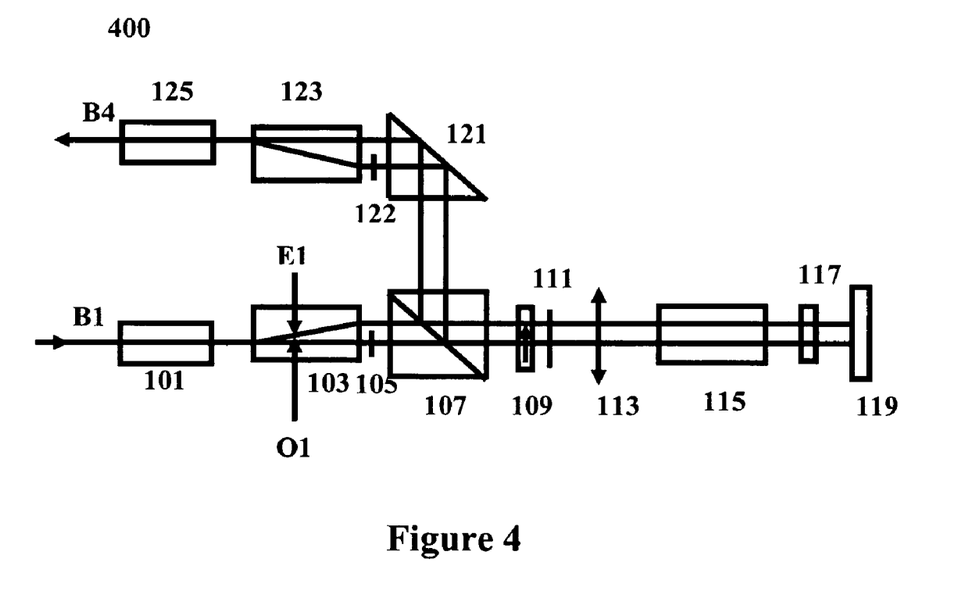
FIG. 4 is a block diagram illustrating the top view of a first embodiment of a DTGE comprising a rotative half-wave plate.

FIG. 4 illustrates a block diagram 400 of the top view of a first embodiment of a DTGE using LTOF technology. Diagram 400 as shown in FIG. 4 comprises: a first collimator denoted 101, a first walk-off crystal denoted 103, a first half-wave plate denoted 105, a polarization beam splitter ("PBS") denoted 107, a Faraday rotator denoted 109, a 22.5° cut half-wave plate denoted 111, a rotative half-wave plate denoted 113, a second walk-off crystal denoted 115, a LTOF denoted 117, a first mirror denoted 119, a second mirror denoted 121, a second half-wave denoted 122, a third walk-off crystal denoted 123, and a second collimator denoted 125.

Figure 5:
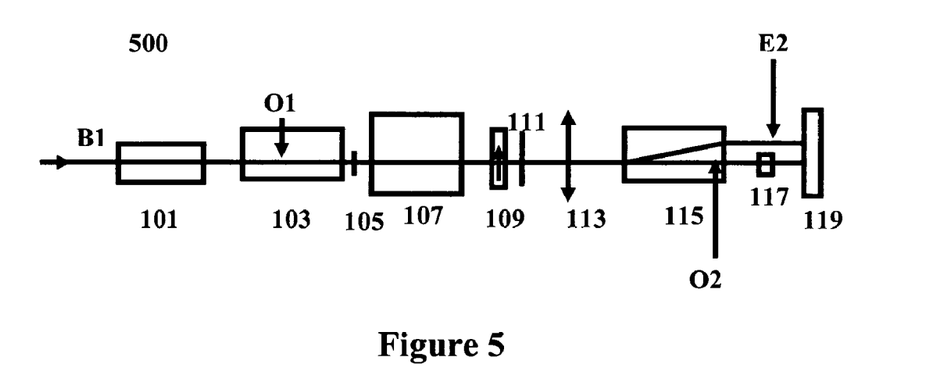
FIG. 5 is a block diagram illustrating the side view of the first embodiment of a DTGE comprising a rotative half-wave plate.

FIG. 5 illustrates a block diagram 500 of the side view of the same embodiment of DTGE as shown in FIG. 4. Diagram 500 comprises: the collimator 101, the first walk-off crystal 103, the first half-wave plate 105, the PBS 107, the Faraday rotator 109, the 22.5° cut half-wave plate 111, the rotative half-wave plate 113, the second walk-off crystal 115, the LTOF 117, and the first mirror 119.

Figure 6:
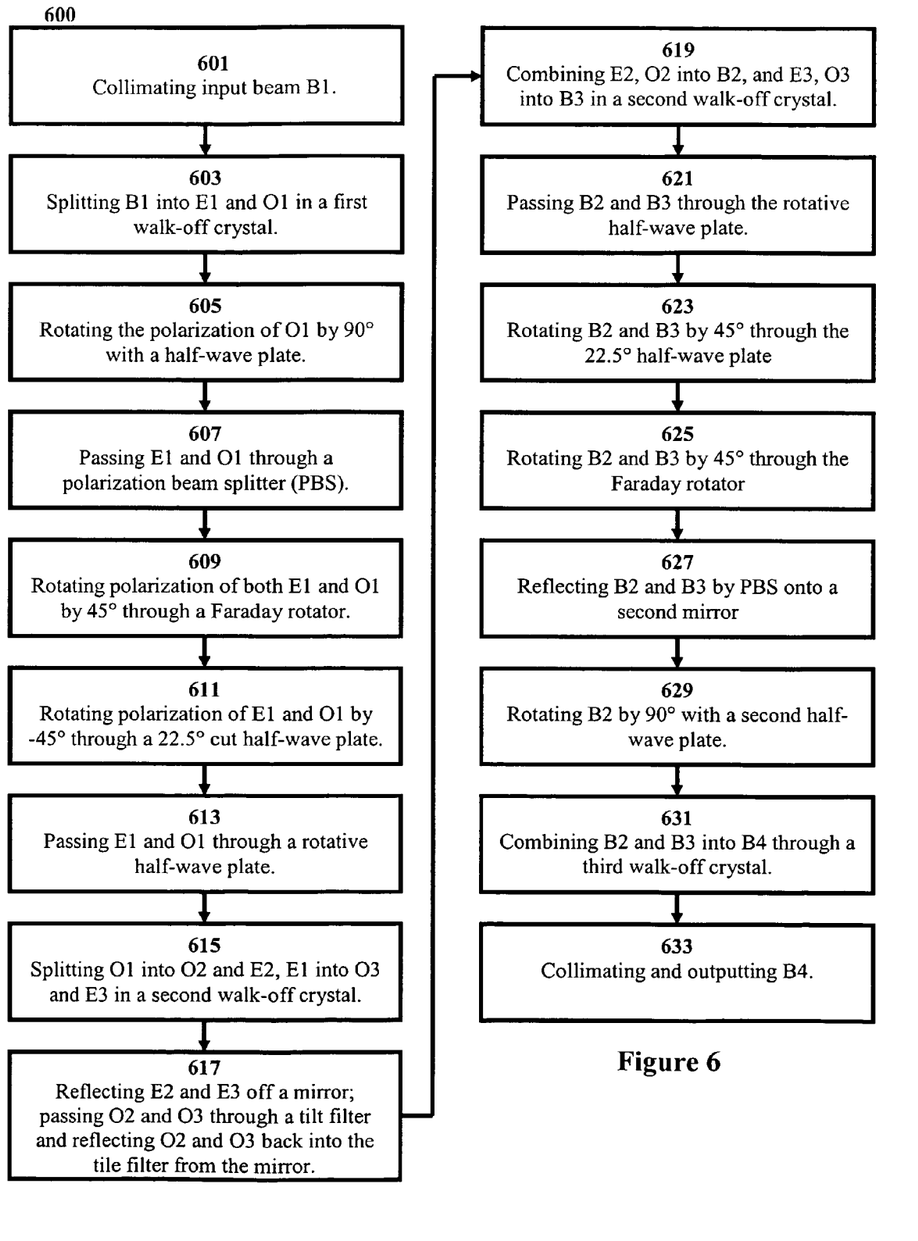
FIG. 6 is a flow chart illustrating the method for flattening gain tilt with the DTGE shown in FIG. 4 and FIG. 5.

FIG. 6 illustrates a flow chart 600 of the steps for dynamically equalizing gain tilt with the DTGE shown in FIG. 4 and FIG. 5. The components and steps described in FIG. 6 are illustrated in FIG. 4 unless otherwise noted. In step 601, collimator 101 collimates an input beam B1. The collimated B1 then passes through the first walk-off crystal 103 that splits B1 into two beams: an extraordinary beam denoted E1 having a polarization parallel to the surface of the paper on which FIG. 4 is drawn, and an ordinary beam denoted O1 having a polarization vertical to the surface of the paper on which FIG. 4 is drawn. In step 605, beam O1 passes through the first half-wave plate 105 that rotates the polarization of O1 by 90° such that O1 has a polarization parallel to the surface of the paper. Both O1 and E1 then pass through the PBS 107 in step 607. Subsequently in step 609, O1 and E1 pass through the Faraday rotator 109 that rotates the polarization of both O1 and E1 by 45°. The 22.5° cut half-wave plate 111 then rotates the polarization of both O1 and E1 by −45° such that O1 and E1 each has a polarization that is parallel to the surface of the paper after passing through the 22.5° cut half-wave plate 111 in step 611.

In step 613, both E1 and O1 pass through the rotative half-wave plate 113. When a linearly polarized beam passes through the rotative half-wave plate 113, the polarization of the beam is rotated by an angle 2α wherein α is the angle between the polarization of the beam and the optic axis of the rotative half-wave plate 113. After passing through the rotative half-wave plate 113, the polarizations of both O1 and E1 are rotated by 2α from the polarization angles of O1 and E1 before they passed through the rotative half-wave plate 113.

Figure 7:
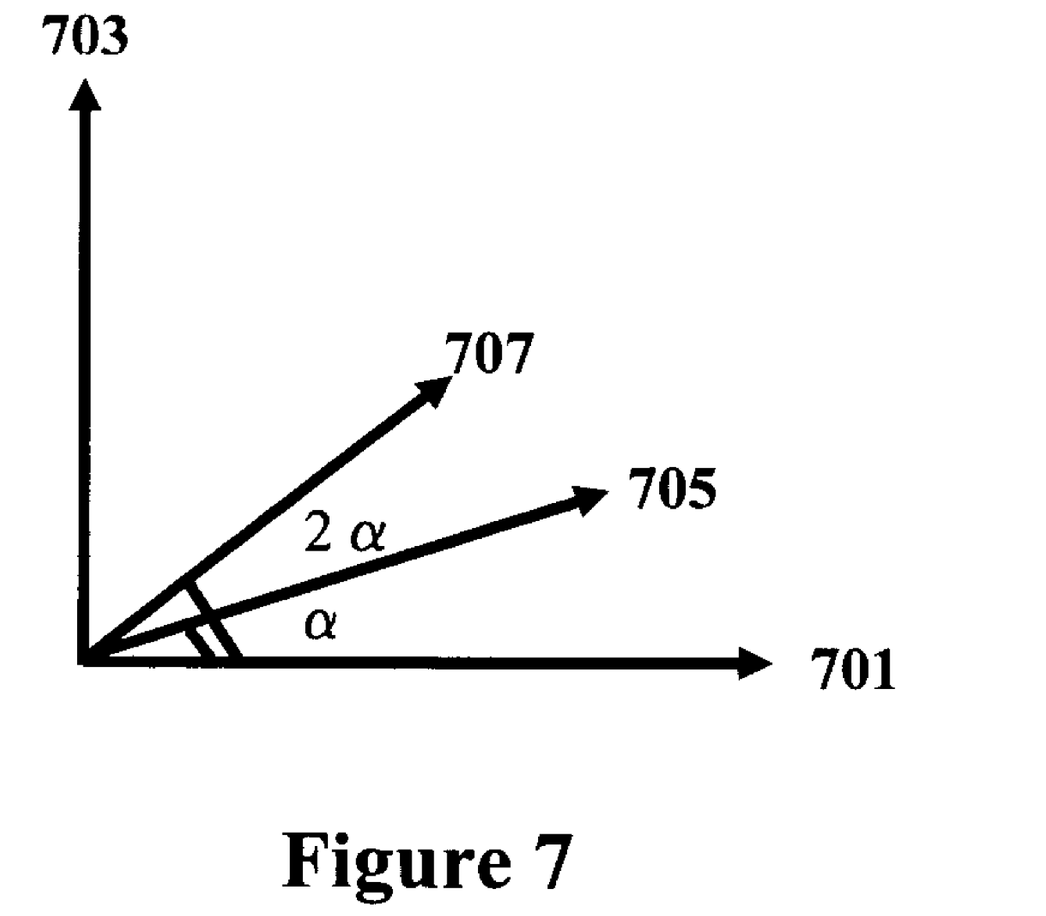
FIG. 7 is an illustration of rotate angles of the polarizations and the half-wave plate shown in FIG. 4 and FIG. 5.

FIG. 7 is an illustration of angle rotation through the rotative half-wave plate 113. FIG. 7 comprises: the horizontal direction (parallel to the surface of the paper on which FIG. 4 is drawn) denoted 701, the vertical direction (vertical to the surface of the paper on which FIG. 4 is drawn) denoted 703, the optic axis of the rotative half-wave plate 113 denoted 705 having an angle α from the horizontal direction 701, and the polarization of a beam after passing through the rotative half-wave plate 113 denoted 707 having an angle 2α from the horizontal direction 701.

In step 615, the beam O1 is split into an ordinary beam O2 and an extraordinary beam E2 after passing through the walk-off crystal 115. Simultaneously in step 615, the beam E1 is split into an ordinary beam O3 and an extraordinary beam E3 after passing through the walk-off crystal 115. Subsequently in step 617, the extraordinary beams E2 (shown in FIG. 5) and E3 (not shown in FIG. 5 but operates as E2 does in FIG. 5) reflect off the mirror 119 back into the walk-off crystal 115 without passing through the LTOF 117 at all as shown in FIG. 5. Simultaneously in step 617, the ordinary beams O2 (shown in FIG. 5) and O3 (not shown in FIG. 5 but operates as O2 does in FIG. 5) pass through the LTOF 117 before reflecting off the mirror 119, pass through the LTOF 117 a second time after reflecting off the mirror 119 as shown in FIG. 5, and finally pass back through the walk-off crystal 115. In step 619, the beams E2 and O2 combine in the walk-off crystal 115 into a beam B2; and the beams E3 and O3 combine in the walk-off crystal 115 into a beam B3.

In step 621, the beams B2 and B3 pass through the rotative half-wave plate 113 and the polarizations of the reflected beams B2 and B3 are returned to horizontal to the paper. In step 623, the polarization of both beams B2 and B3 rotate by 45° after passing through the 22.5° cut half-wave plate 111. Moreover, the polarization of both beams B2 and B3 rotate again by 45° in step 625 after passing through the Faraday rotator 109. In step 627, the beams B2 and B3 reflect off the PBS 107 onto the mirror 121 that reflects both beams. The polarization of the beam B2 is then rotated by 90° after passing through the half-wave plate 122 while the polarization of the beam B3 remains unaltered after step 629. Both beams B2 and B3 then combine into beam B4 after passing through the walk-off crystal 123 in step 631. The beam B4 is subsequently collimated after passing through the collimator 125.

Figure 11:
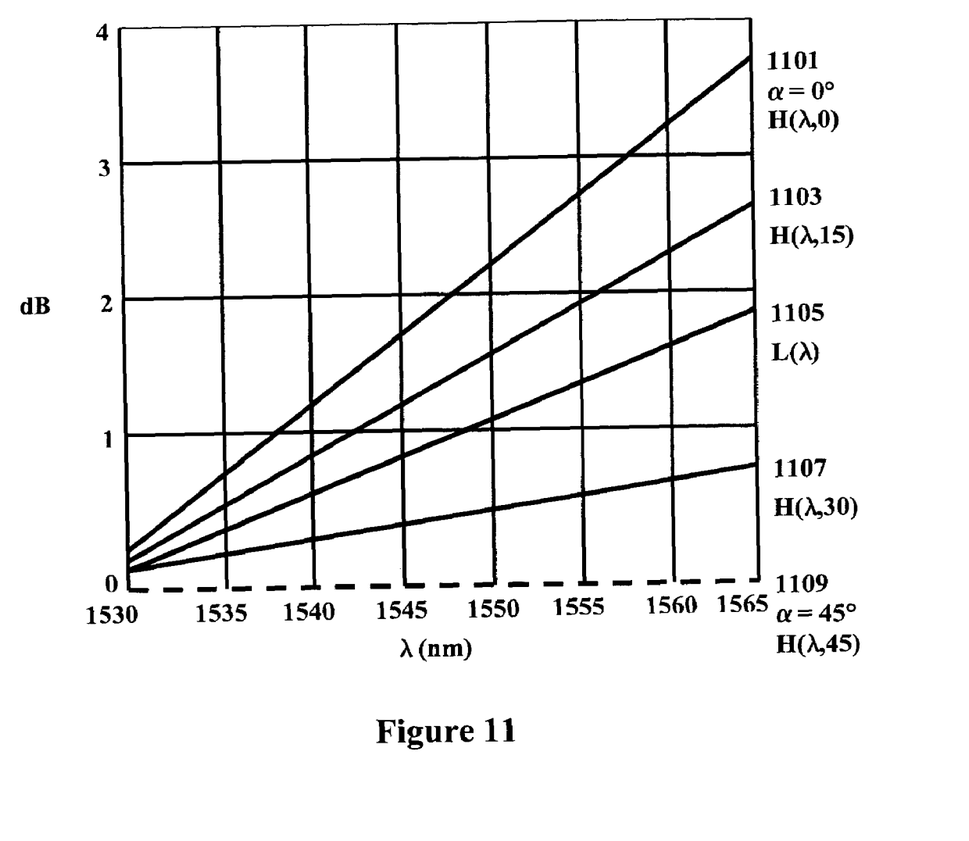
FIG. 11 is an attenuation profile of the DTGE with a rotative half-wave plate shown in FIG. 4 and FIG. 5.

The attenuation profile of the DTGE illustrated in FIG. 4 and FIG. 5 is defined as:

$$H(\lambda, \alpha) = -10\log\frac{I_{out}(\lambda)}{I_{in}} = -20\log[(\sin 2\alpha)^2 + (E(\lambda)\cos 2\alpha)^2] \quad \text{(Equation 2)}$$

$$E(\lambda) = 10^{-0.05L(\lambda)} \quad \text{(Equation 3)}$$

wherein λ is the wavelength of the light, L(λ) is the loss of the light through LTOF 117, and α is the angle between the polarization of a light beam and the optic axis of the rotative half-wave plate 113. As shown in FIG. 11, when α=0°, the polarization of the beams E1 and O1 are horizontal and parallel to the surface of the paper after they pass through the rotative half-wave plate 113. In this case, all the power of the beams O1 and E1 are transferred to the beams O2 and O3 respectively before O2 and O3 pass through the LTOF 117 twice. As illustrated in FIG. 11, the slope of the α=0° line 1101 is double that of the slope (denoted 1105) of the light loss L(λ).

Conversely, when α=45°, the polarization of the beams E1 and O1 are rotated by 90° after passing through the rotative half-wave plate 113 and become vertical to the surface of the paper. In this scenario, all the power of the beams O1 and E1 are transferred to the beams E2 and E3 respectively before E2 and E3 are reflected back by the mirror 119 without passing through the LTOF 117. As illustrated in FIG. 11, the slope of the α=45° line 1109 is zero.

Alternatively, when α is between 0° and 45°, the slope of the attenuation profile of the DTGE shown in FIG. 4 and FIG. 5 are in a range from 0 to 2×0.05 dB/nm (assuming LTOF 117 has a slope of 0.05 dB/nm). Therefore, the DTGE shown in FIG. 4 and FIG. 5 uses a LTOF 117 with a fixed slope in order to dynamically control the slopes of the attenuation profile within the range of 0° and double the constant slope of LTOF 117.

Figure 8:
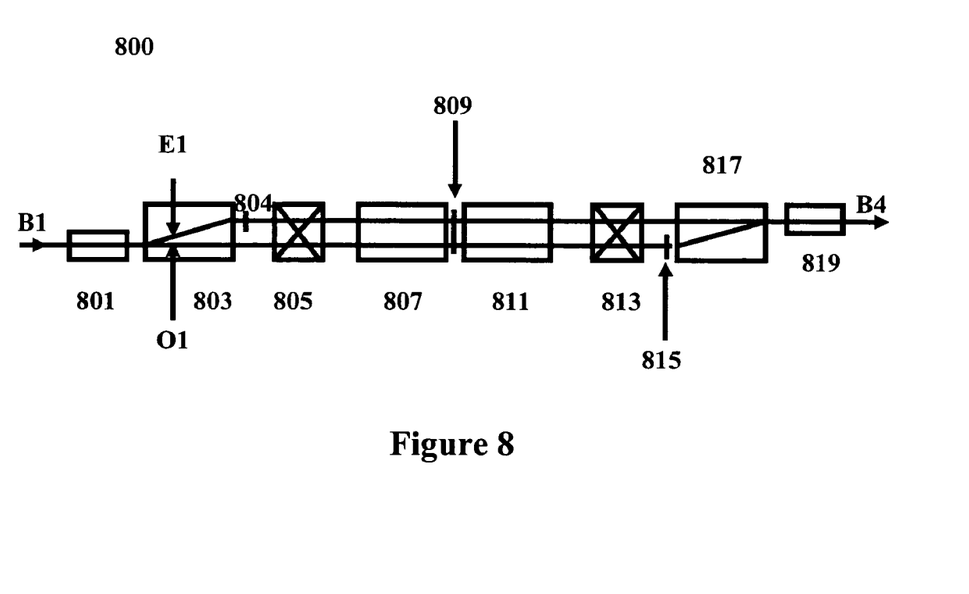
FIG. 8 is a block diagram illustrating the top view of a second embodiment of a DTGE comprising variable Faraday rotators.

FIG. 8 illustrates a block diagram 800 of the top view of a second embodiment of a DTGE using LTOF technology. Diagram 800 as shown in FIG. 8 comprises: a first collimator denoted 801, a first walk-off crystal denoted 803, a first half-wave plate denoted 804, a first variable Faraday rotator ("VFR") denoted 805, a second walk-off crystal denoted 807, a LTOF denoted 809, a third walk-off crystal denoted 811, a second VFR denoted 813, a second half-wave plate denoted 815, a fourth walk-off crystal denoted 817, and a second collimator denoted 819.

Figure 9:
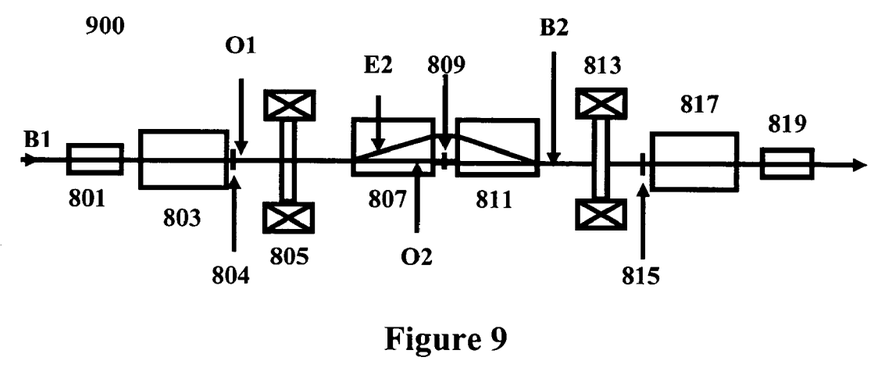
FIG. 9 is a block diagram illustrating the side view of the second embodiment of a DTGE comprising variable Faraday rotators.

FIG. 9 illustrates a block diagram 900 of the side view of the second embodiment of DTGE shown in FIG. 8. Diagram 900 as shown in FIG. 9 comprises: the first collimator 801, the first walk-off crystal 803, the first half-wave plate 804, the first VFR 805, the second walk-off crystal 807, the LTOF 809, the third walk-off crystal 811, the second VFR 813, the second half-wave plate 815, the fourth walk-off crystal 817, and the second collimator 819.

Figure 10:
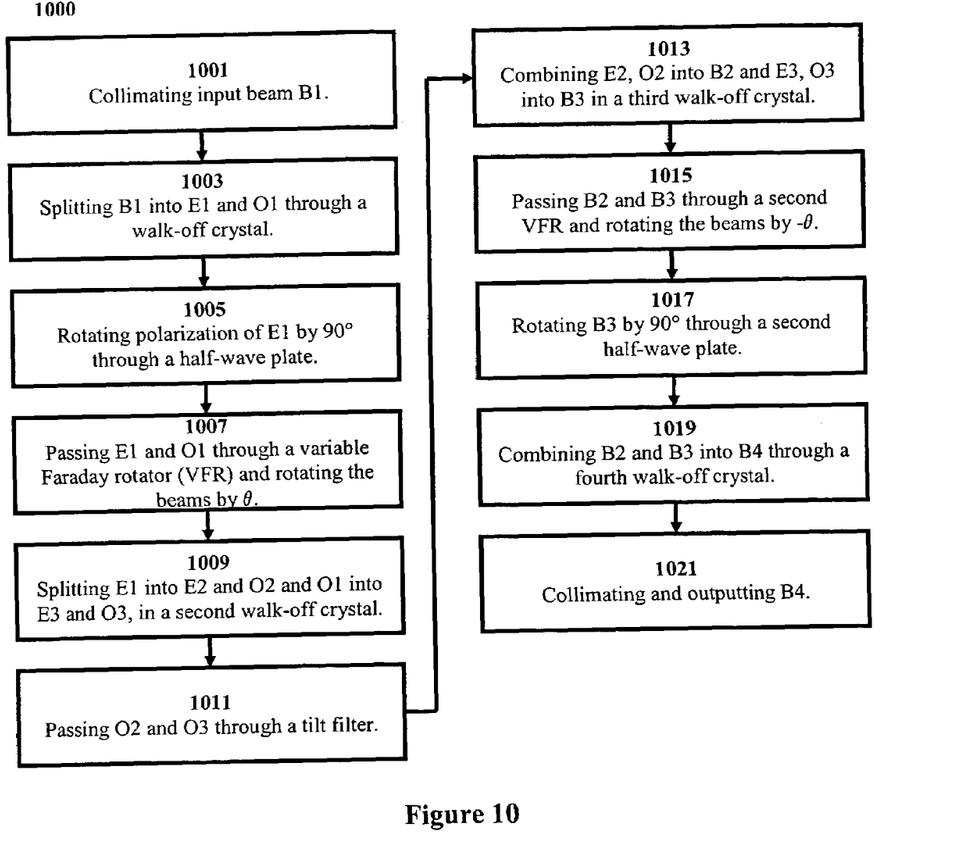
FIG. 10 is a flow chart illustrating the method for flattening gain tilt with the DTGE shown in FIG. 8 and FIG. 9.

FIG. 10 illustrates a flow chart 1000 of the steps for dynamically equalizing gain tilt with the DTGE shown in FIG. 8 and FIG. 9. The components and steps described in FIG. 10 are illustrated in FIG. 8 unless otherwise noted. In step 1001, collimator 801 collimates an input beam B1. The collimated B1 then passes through the first walk-off crystal 803 that splits B1 into two beams: an extraordinary beam denoted E1 having a polarization parallel to the surface of the paper on which FIG. 8 is drawn, and an ordinary beam denoted O1 having a polarization vertical to the surface of the paper on which FIG. 8 is drawn. Subsequently in step 1005, the polarization of E1 rotates by 90° after passing through the half-wave plate 804. In step 1007, the polarization of both E1 and O1 rotate by θ after passing through VFR 805, wherein θ is controlled by the current passing through VFR 805. The beam O1 is then split into an extraordinary beam E2 and an ordinary beam O2, and the beam E1 is split into an extraordinary beam E3 and an ordinary beam O3; after both E1 and O1 pass through the walk-off crystal 807 in step 1009. After E1 and O1 are split, the ordinary beams O2 (shown in FIG. 9) and O3 (not shown in FIG. 9 but operates as O2 does in FIG. 9) pass through LTOF 809 in step 1011 as shown in FIG. 9. In step 1013, the extraordinary beam E2 (shown in FIG. 9) combines with ordinary beam O2 to form B2 (shown in FIG. 9) and extraordinary beam E3 (not shown in FIG. 9 but operates as E2 does in FIG. 9) combines with ordinary beam O3 to form B3 (not shown) after passing through the walk-off crystal 811. The polarization of the beams B2 and B3 rotate by −θ after passing through the VFR 813, wherein the currents in VFR 805 and in VFR 813 are identical in amplitude but opposite in direction. The polarization of beam B2 rotates by 90° after passing through the half-wave plate 815 in step 1017 while the polarization of B3 remains constant as shown in FIG. 8 and FIG. 9. In step 1019, the beams B2 and B3 combine to form B4 after passing through the walk-off crystal 817. The beam B4 is subsequently collimated after passing through the collimator 1021.

The attenuation profile of the DTGE shown in FIG. 8 and FIG. 9 is defined as:

$$H(\lambda, \theta) = -10\log\frac{I_{out}(\lambda)}{I_{in}} = -20\log[\cos^2\theta + E(\lambda)\sin^2\theta] \quad \text{(Equation 4)}$$

wherein λ is the wavelength of the light, E(λ) is as defined by Equation 3, and θ is the rotate angle of VFR 805.

Figure 12:
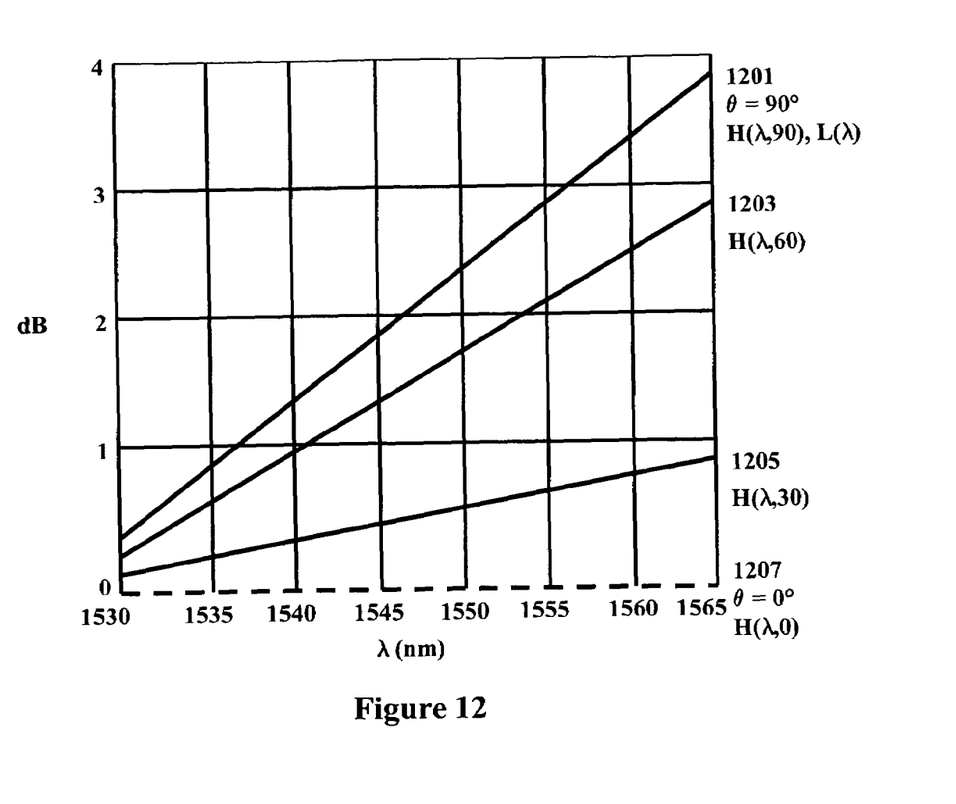
FIG. 12 is an attenuation profile of the DTGE with a variable Faraday rotator shown in FIG. 8 and FIG. 9.

When θ=0°, the polarization of the beams E1 and O1 are horizontal and parallel to the surface of the paper of FIG. 9 after passing through VFR 805. In this case, all the power of the beams E1 and O1 are transferred to E3 and E2 respectively before E2 and E3 are directed into the walk-off crystal 811 without passing through LTOF 809 shown in FIG. 8. Therefore, as shown in FIG. 12, the slope of the θ=0° line 1207 is zero.

Conversely, when θ=90°, the polarizations of the beams E1 and O1 rotate by 90° and vertical to the surface of the paper of FIG. 9 after passing through VFR 805. In this scenario, all the power of the beams E1 and O1 are transferred to O3 and O2 respectively, and O2 and O3 pass through LTOF 809 before entering the walk-off crystal 811. Therefore, the slope of the θ=90° line 1201 is the same as that of E(λ) of the LTOF 809.

Alternatively, when θ is between 0° and 90°, the slope of attenuation profile of the DTGE shown in FIG. 8 and FIG. 9 are in a range within 0 to 0.05 dB/nm (assuming LTOF 809 has a slope of 0.05 dB/nm). Therefore, the DTGE shown in FIG. 8 and FIG. 9 uses a LTOF 117 with a fixed slope in order to dynamically control the slopes of the attenuation profile within the range of 0° and the constant slope of LTOF 809.

Although the invention has been described in connection with several embodiments, it is understood that this invention is not limited to the embodiments disclosed, but is capable of various modifications that would be apparent to a person skilled in the art.

For example, although the invention as described above is configured to flatten a positively sloped gain, the system may be adjusted in order to flatten a negatively sloped gain.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the arts to best utilize the invention and various embodiments with various modifications as are suited to the particular use contemplated. It is intended that the scope of the invention be defined by the Claims appended hereto and their equivalents.

We claim:

1. A dynamic gain tilt equalizer, comprising:
    a first collimator for collimating a first light beam;
    a first walk off crystal for receiving the collimated light beam from the collimator and dividing the light beam into a first ordinary beam and a first extraordinary beam;
    a first half-wave plate for receiving the first extraordinary beam from the first walk off crystal;
    a first variable Faraday rotator for receiving the first ordinary beam from the first walk-off crystal and the first extraordinary beam from the first half-wave plate;
    a second walk-off crystal for receiving the first ordinary beam and the first extraordinary beam from the first variable Faraday rotator, for dividing the first ordinary beam into a second ordinary beam and a second extraordinary beam, and for dividing the first extraordinary beam into a third ordinary beam and a third extraordinary beam;
    a linear tilt optical filter for receiving the second ordinary beam and the third ordinary beam from the second walk-off crystal;
    a third walk-off crystal for receiving the second extraordinary beam from the second walk-off crystal and combining it with the second ordinary beam from the linear tilt optical filter to form a second light beam, and for receiving the third extraordinary beam from the second walk-off crystal and combining it with the third ordinary beam from the linear tilt optical filter to form a third light beam;
    a second variable Faraday rotator for receiving the second and the third light beams from the third walk-off crystal;
    a second half-wave plate for receiving the second light beam from the second variable Faraday rotator;
    a fourth walk-off crystal for receiving the second light beam from the second half-wave plate and third light beam from the second Faraday rotator, and for combining the second and the third light beam to form a fourth light beam; and
    a second collimator for receiving the fourth light beam from the fourth walk-off crystal.

2. A method for dynamically adjusting gain tilt, the method comprising:
    collimating a first light beam;
    splitting the input light beam into a first extraordinary beam and a first ordinary beam;
    rotating the polarization of the first extraordinary beam by 90°;
    passing the first extraordinary beam and the first ordinary beam through a variable Faraday rotator;
    splitting the first extraordinary beam into a second extraordinary beam and a second ordinary beam, and splitting the first ordinary beam into a third extraordinary beam and a third ordinary beam; and
    passing the second and the third ordinary beams through a linear tilt optical filter.

3. The method of claim 2, further comprising the step of combining the second extraordinary beam and the second ordinary beam into a second light beam, and combining the third extraordinary beam and the third ordinary beam into a third light beam.

4. The method of claim 3, further comprising the step of passing the second and the third light beams through a second variable Faraday rotator.

5. The method of claim 4, further comprising the step of rotating the third light beam by 90°.

6. The method of claim 5, further comprising the step of combining the second and the third light beams into a fourth light beam.

7. The method of claim 6, further comprising the step of collimating the fourth light beam.

* * * * *